United States Patent
Obermaier et al.

[15] 3,688,576
[45] Sept. 5, 1972

[54] IMPROVED AIR VELOCITY MEASURING SYSTEM AND METHOD FOR ITS CALIBRATION

[72] Inventors: Alfred A. Obermaier, Barrington; Martin J. Pierman, Mount Prospect, both of Ill.

[73] Assignee: Alnor Instrument Company, Div. of Illinois Testing Laboratories, Inc., Chicago, Ill.

[22] Filed: July 24, 1970

[21] Appl. No.: 58,075

Related U.S. Application Data

[63] Continuation-in-part of Ser. No. 687,084, Nov. 13, 1967, abandoned.

[52] U.S. Cl. .................................... 73/202, 73/205 R
[51] Int. Cl. ................................................. G01f 5/00
[58] Field of Search....73/182, 178 R, 202, 203, 212, 73/213, 205 R

[56] References Cited

UNITED STATES PATENTS

| | | | |
|---|---|---|---|
| 3,474,669 | 10/1969 | Carter et al. | 73/178 |
| 2,985,013 | 5/1961 | Yeager et al. | 73/182 |
| 1,946,275 | 2/1934 | Collins | 73/230 |
| 2,342,290 | 2/1944 | Miller | 73/202 |

OTHER PUBLICATIONS

An Article Entitled "Improved Calibration Method for a Five Hole Spherical Pitot Probe" by C. F. R. Nowack from the Journal of Applied Physics E, Jan. 1970 pages 21–26, (page 21)

Primary Examiner—James J. Gill
Attorney—Silverman & Cass

[57] ABSTRACT

A rapid response air velocity measuring system having a shunting probe adapted to be placed into a flow of air and coupled to a measuring apparatus, such as an air flow meter. A handle portion as constructed to receive the shunting probe as well as other forms of probes, such as diffuser probes, and couple the probe to the measuring apparatus. A range adjusting switch is mounted in the handle portion and places one of a plurality of resistances, in the form of one of a plurality of needle valves, into the path of the air flow trough the measuring apparatus. Push button vent means also is carried in the handle portion for enabling the system to employ diffuser as well as shunting probes. The probes are fine tuned and specially calibrated to a pitot standard, then the probes, the range adjusting switch, and the measuring apparatus are calibrated to the pitot standard as a system. Once calibrated, the individual elements of the system are interchangeable with the corresponding elements of similarly pitot-calibrated, mass produced systems, without requiring subsequent recalibration of each system.

21 Claims, 8 Drawing Figures

PATENTED SEP 5 1972 3,688,576

INVENTORS
ALFRED A. OBERMAIER
MARTIN J. PIERMAN

BY  *Silverman & Cass*

ATTYS.

PATENTED SEP 5 1972
3,688,576
SHEET 2 OF 2
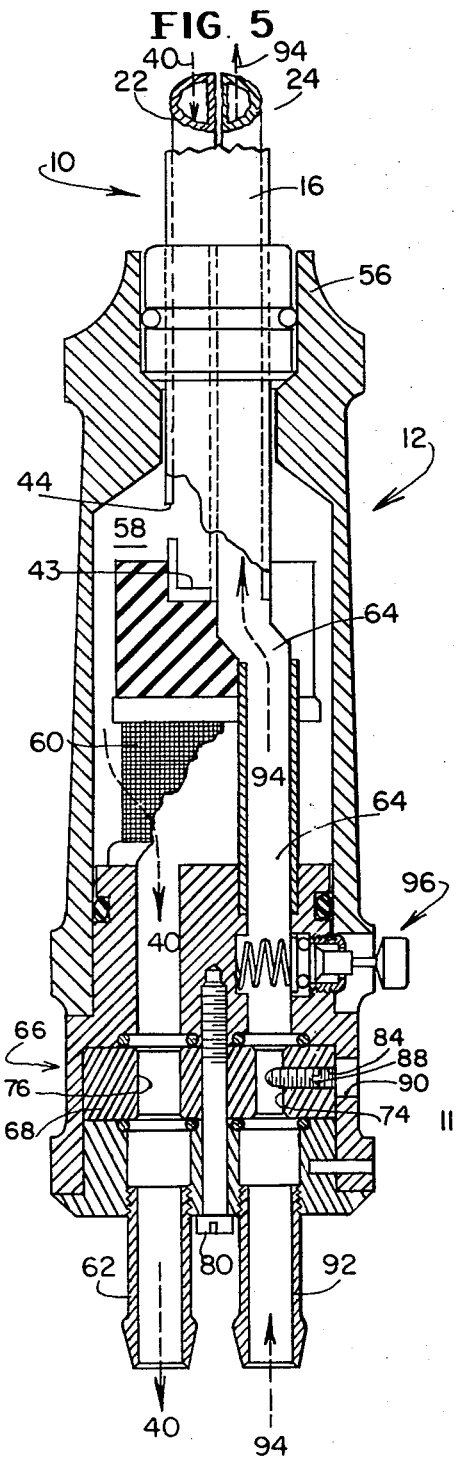
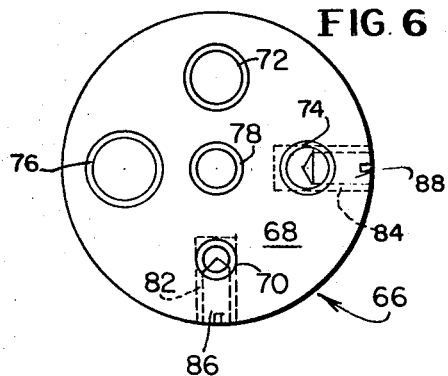
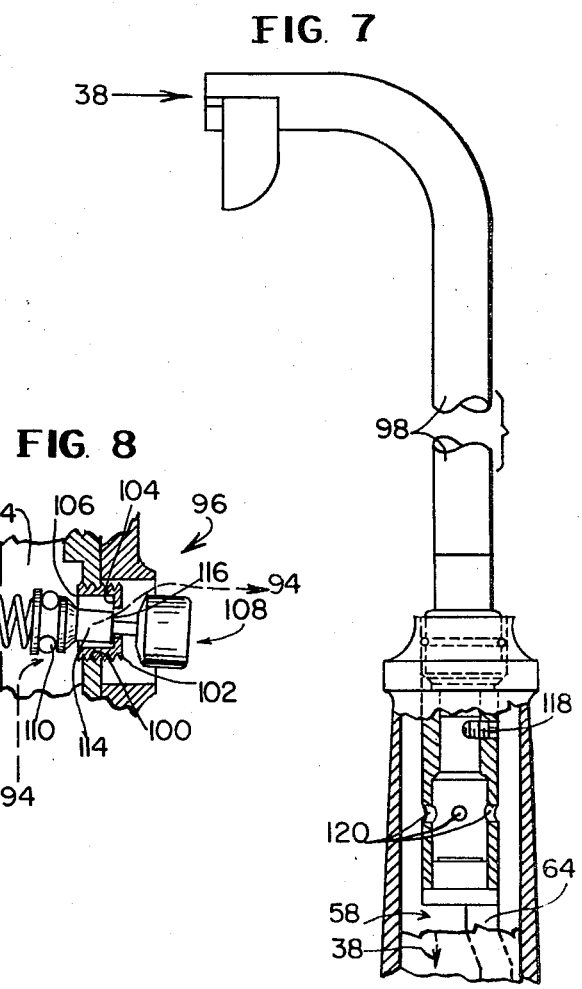
Inventors
ALFRED A. OBERMAIER
MARTIN J. PIERMAN
BY
Silverman & Cass
ATTYS.

IMPROVED AIR VELOCITY MEASURING SYSTEM AND METHOD FOR ITS CALIBRATION

CROSS REVERENCE TO RELATED APPLICATIONS

This is a Continuation-in-part of our copending application Ser. No. 687,084; filed on Nov. 13, 1967, entitled "Air Velocity Measuring System" now abandoned.

To the extent that it may become necessary, said copending application is incorporated herein.

BACKGROUND OF THE INVENTION

This invention relates generally to a rapidly responding air velocity measuring system and components thereof and, in particular, to an air velocity measuring system comprising a plurality of elements possessing a common pitot calibration and capable of mass production, such that recalibration or matching of elements in any particular system is obviated.

Air velocity measuring systems are generally well known as a tool of heating, ventilating and air conditioning engineers and servicemen. Such measuring systems generally comprise an air flow meter, which has one or more accessories attached thereto. A typical air flow meter is shown in U.S. Pat. No. 2,690,671 to J. A. Obermaier et al., issued Oct. 5, 1954.

Jets and probes are common accessories used in combination with air flow meters to obtain air velocity readings and generally have an inlet and an outlet opening at each end. One end is coupled by a suitable fitting, such as a handle portion, to the meter and the other end is adapted to be inserted through the duct wall so that the air flow enters the inlet opening. There are a variety of jets and probes to serve various purposes.

For example, there is a static pressure jet, which measures the pressure at right angles to the direction of air flow in ducts, plenum chambers, or pipes. The static pressure jet generally consists of a rubber suction cup affixed to one end of a conduit, the other end of the conduit being adapted for connection to the meter. This jet is calibrated with respect to a specific air flow meter and an appropriate scale in inches of water is printed thereon.

A total pressure jet is commonly used to obtain the total pressure of the air flow within a duct or plenum. The total pressure consists of the static pressure plus the velocity pressure of the air flow. The air flow meter and the total pressure jet are calibrated as a unitary system and a scale in inches of water is then printed on the meter corresponding to the calibrations.

A diffuser jet is used in combination with a meter to measure the air velocity at the lips or cones of an air diffuser. The diffuser jet generally consists of a conduit having a pair of guide fins for engaging the diffuser affixed at one end. The combination of the jet and the meter is calibrated as a unit and a scale is printed on the meter corresponding to the calibrations.

The prior art air velocity measuring systems, as briefly described above, require each specific accessory to be calibrated with a specific meter and an appropriate scale to be printed on the meter. Each accessory or combination of accessories, once calibrated with a particular meter, cannot be used with any other meter. If an accessory is lost, damaged, or destroyed, the meter must be returned to the factory to have a new accessory calibrated with the meter. Also, if a customer requires a duplicate or a new accessory, the meter must be returned so that such accessory can be calibrated with the meter. Each accessory has a serial number which is printed on the meter with which is was calibrated.

When a meter is returned to the factory to have a lost accessory replaced, the scale representing the calibration of the lost accessory must be removed from the meter and a new scale printed thereon representing the calibration of the new accessory. The attempt to change scale designations frequently results in the obliteration of adjacent valid scale data; accordingly, it is common practice to have all of the scales redrawn when the meter is returned for a single correction. Necessarily, each time the meter is sent to the factory, the customer loses the use of the meter, which further increases his operating expenses. To obviate this lost time, some customers have found it necessary to obtain a spare meter and set of accessories for the spare meter; thus, further increasing operating overhead.

The invention in the cited copending application overcame the above described deficiencies in the prior art by providing a pitot calibrated system, having a shunting type probe adjustable to a pitot standard. One drawback to the design of the probe was that it limited the full scale air flow through the meter and thereby placed a response speed limit upon the otherwise superior performing system. Another limitation of the probe was that it did not track the pitot standard over a wide enough range of flow conditions.

Another feature of the copending application was a range adjusting switch in the handle portion. The design of the switch also caused it to limit maximum air flow and additionally to cause the selectable air resistors of the switch to have to be positioned downstream of the meter movements.

A further limitation of the structure in the copending application was its lack of a suitable return path venting for use with a diffuser jet.

SUMMARY OF THE INVENTION

The air velocity measuring system made in accordance with this invention eliminates the problems and restrictions which are characteristic of prior art systems, including that of the copending application as above described, and includes a probe tip and probe housing combination which is calibrated to match a pitot tube standard and track it over a wide range of air flow conditions.

To differentiate this probe unit from other probes used with the invention, we will refer to it as a "pitot probe." probe housing comprises a conduit having a pair of parallel tubes and the pitot probe tip comprises an air flow member having a tapered passageway lying transverse to one end of the conduit and suitable for insertion into and parallel with a moving air stream. A fixed baffle or gate and a variable baffle are positioned diametrically opposite each other within the air flow member so as to protrude into the passageway. The variable baffle is coaxial with the conduit and is adjustable, so that a predetermined, pitot calibrated portion of the air flowing into the passageway is channeled or shunted into one of the pair of tubes. The stem of the air flow member telescopes into the conduit and has a pair of longitudinal channel configurations which lead, respectively, into the parallel tubes of the conduit. The diameter at the input side of the passageway, and the height of the gate are significantly related. The cross section of the channels are sized to maximize the air flow into the measuring device. After the pitot probe has been calibrated initially so that the pressure of the air channeled into one of the pair of tubes matches the pressure reading of the pitot tube standard, it will always match the pressure read by the pitot tube standard, for any velocity of air. Hence, the pitot probe never has to be calibrated again and the variable baffle is sealed at the factory to prevent accidental change of its setting.

A range adjusting switch is interposed in a handle portion between the probe and the measuring device; however, the probe can be coupled directly to any suitable measuring device. The range adjusting switch has pairs of separately defined passageways, positioned to mate with the two tubes of the pitot probe, and a rotatable plate carrying a plurality of externally accessable needle valves, which place different amounts of resistance within the air flow path through the measuring device, thereby extending its range in multiples of the full scale reading.

The handle portion is also provided with a push button operated valve, which provides a return or venting path wherever such is not available, such as when a calibrated diffuser jet replaces the pitot probe.

Accordingly, the principal object of this invention is to provide a pitot standarized, rapidly responding, air velocity measuring system comprising precalibrated components, interchangeable with system components and their replacements in a modular manner, thereby obviating component recalibration.

It is another object of this invention to provide an improved probe tip which accurately tracks a pitot tube standard.

It is a further object of this invention to provide an improved range adjusting switch which is externally accessable during calibration and greatly expands the range of an air flow measuring device independent of the full scale calibration of such a device.

It is a further object of this invention to provide novel venting means in an accessory handle portion for an air velocity measuring system.

It is yet another object of this invention to provide a greatly improved method for calibrating an air velocity measuring system to tract a pitot standard.

Many other objects will occur to those skilled in this art, as a detailed description of a preferred embodiment of the invention is set forth in connection with the accompanying drawings.

BRIEF DESCRIPTION OF THE DRAWINGS

FIG. 5 is a longitudinal section through the accessory handle portion, showing the range selecting switch and the venting valve, the latter being closed for use with the pitot probe;

FIG. 6 is a top plan view of the switch plate of the range selecting switch;

FIG. 7 is a side elevation of a diffuser jet seated in the handle portion; and

FIG. 8 is a detailed side view of the venting valve, shown open for use with a diffuser jet.

DESCRIPTION OF THE PREFERRED EMBODIMENT

Figure 1:
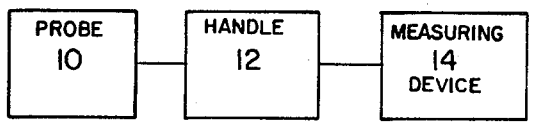
FIG. 1 is a block diagram of an air velocity measuring system according to this invention and consists of a probe, a handle portion for housing venting valve means and a range adjusting switch, and a measuring device.

Referring now to the drawings, FIG. 1 is a block diagram of the air velocity measuring system consisting of a probe 10, an accessory handle portion 12, and a measuring device 14 suitable for measuring the velocity of air and having an input and an output, integral therewith.

Figure 2:
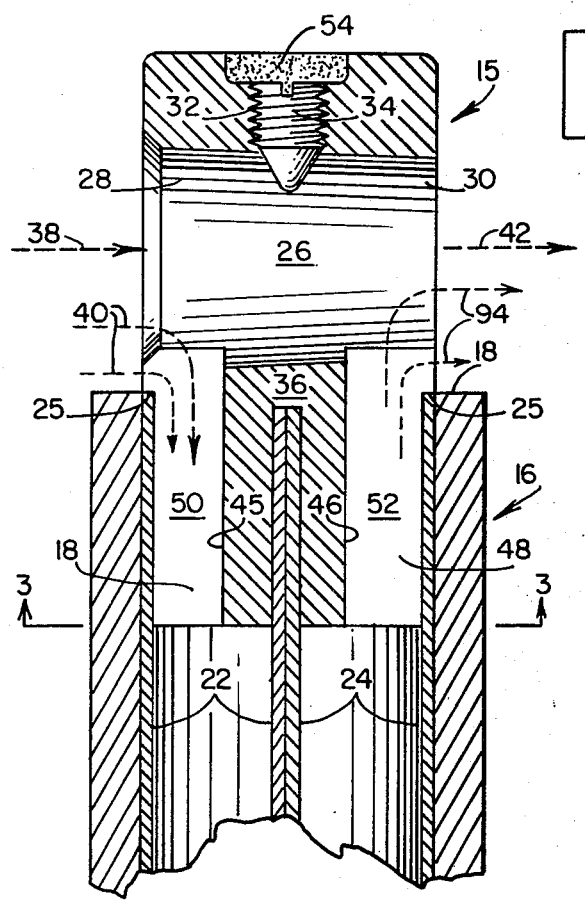
FIG. 2 is a longitudinal section through an improved probe constructed in accordance with the invention.
Figure 2:
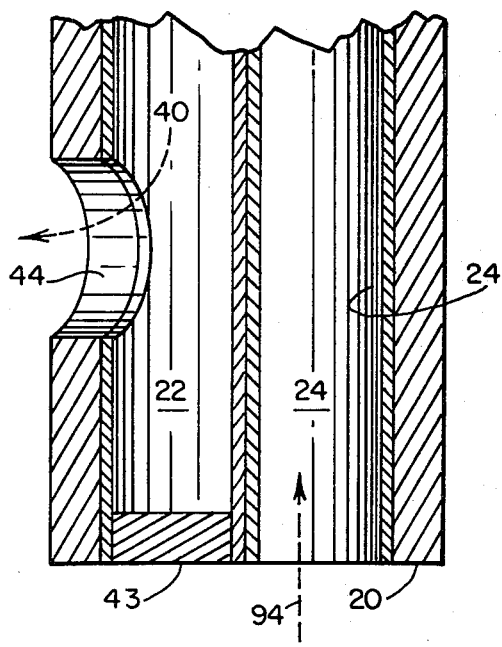
Figure 3:
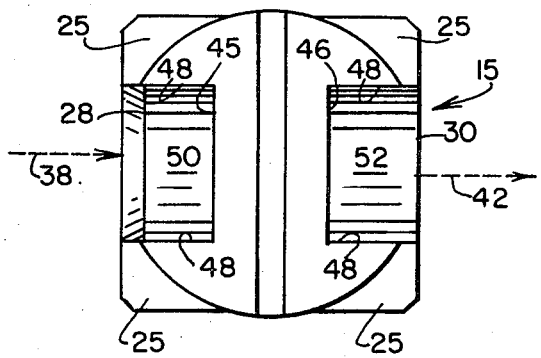
FIG. 3 is a bottom plan view taken along the line 3—3 of the probe structure illustrated in FIG. 2.
Figure 4:
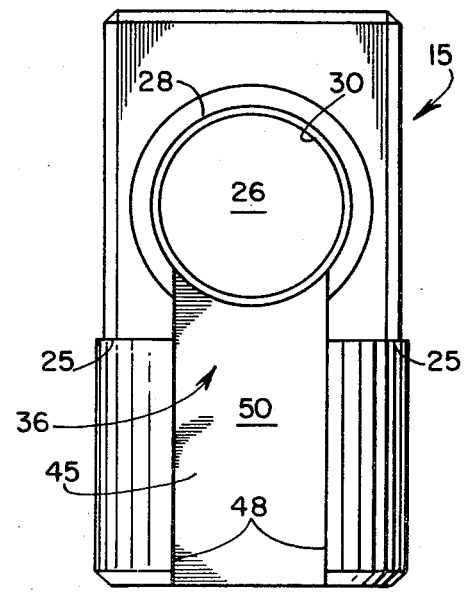
FIG. 4 is a side view of the probe tip structure illustrated in FIG. 2.

The entire probe 10, is illustrated in FIG. 2, and the improved pitot probe tip 15 is illustrated in FIGS. 2–4. The probe comprises a conduit 16, having two ends 18 and 20. A pair of tubes 22 and 24 of D-shape cross section are longitudinally positioned within the conduit 16, such that their respective arcuate surfaces abut the interior wall of the conduit 16. It will be appreciated that the conduit and tubes also could be defined by a unitary structure and that the tubes may have other than the preferred D-shape cross section.

The pitot probe tip 15 is telescoped into the conduit end 18 and seats thereagainst via a segmented shoulder 25 which also acts as a calibration aid, as will be elaborated upon subsequently. A transverse, slightly tapered passageway 26 extends through the probe tip. The air input side 28 of the passageway 26 has a larger diameter than the static outlet side 30. The input side 28 additionally is countersunk; whereas, the outlet side 30 is smooth.

A variable baffle, which comprises a threaded bore 32 and a needle screw 34, is positioned in the probe tip and extends partially into the passageway 26. A fixed baffle or gate 36 is positioned opposite the pointed end of the needle screw 34 so that an air stream, as represented by the arrow 38, entering the passageway 26 is partially channeled or shunted into the tube 22 as represented in FIG. 2 by the arrow 40. The remaining part of the air stream, represented by an arrow 42 passes directly through the passageway 26.

The lower end of the tube 22 contains a plug 43 and a transverse aperture 44 which act to direct the air velocity pressure component 40 outward from the probe to the handle portion 12.

As can be understood more easily with reference to each of FIGS. 2–4, the top of the gate 36 is part of the wall of the passageway 26. Also, the portion of the probe tip below the passageway 26 is bifurcated by the gate 36 to define, in combination with the longitudinal walls 45 and 46 of the gate and the internal walls 48 of the probe tip, a pair of channels 50 and 52, having a relatively large cross section, capable of accepting all of the shunted air stream 40 and providing a static side return path without acting as an air flow impedance.

A comparison of the pitot probe tip 15 with its counterpart air flow member in the cited copending application will reveal that, although their generic configurations are similar, the larger size, tapered configuration, countersunk input and smooth output side, which define the passageway 26, all are significantly different from the structure which defines the counterpart passageway in the copending application. Likewise, the gate 36, its size, rectangular shape, position relative to the passageway 26, and longitudinal sidewalls which cooperate in forming the large air channels 50 and 52, all are quite different from the fixed baffle in the copending application. Not only do the above noted structural differences enable an increased flow of air into the probe tip to increase the volume of the air streams 40 and 42, and thereby enable the measuring device 14 to have a greatly increased full scale flow rate and to respond more rapidly, some of the structural improvements coact, in a manner heretofore unobvious, to greatly increase the accuracy of the pitot standard tracking of this improved probe tip.

The gate 36 and the variable baffle components 32, 34 are used in combination to calibrate the probe 10 to a pitot tube standard; also, most importantly as described hereinafter, the input side of the probe tip independently is sized to be calibrated to the pitot standard. The air stream 38 entering the passageway 26 has a total pressure which consists of a velocity pressure and a static pressure. The velocity pressure component 40 is, diverted into the tube 22 primarily by the gate 36; whereas, the variable baffle is employed for fine adjustment of the air flow 40 into the tube 22, so that the velocity pressure of the channeled air stream 40 matches the pressure indicated by the pitot tube standard.

In order to calibrate the probe 10, it and a pitot tube standard are independently connected to the same duct to monitor the velocity pressure of an air stream having a substantially constant velocity. The pitot tube standard measures the differential pressure, which is equivalent to the velocity pressure of the air stream. After the pitot probe has been matched so that the pressure of the air channeled into tube 22 matches the pressure reading of the pitot tube standard, it will always match the pressure read by the pitot tube standard regardless of the velocity of the air stream.

Although the following calibration procedure refers to specific measurements, with relation to a full scale reading of 700 cc per minute, those skilled in the art will be able to adapt these teachings to the calibration of pitot probes for different full scale flow conditions and different construction parameters.

Initially, the passageway 26 is a circular cylinder having a diameter which is slightly smaller than 0.250 inch, such as 0.234 inch or 15/64 inch. The probe tip 15 is seated in the conduit 16 so that the axis of the passageway 26 lies 0.20 inch above the top end 18 of the conduit. The segmented shoulders 25 can provide this important orientation, which initially causes the gate 36 to protrude into the air stream 38 between 4/64 inch and 5/64 inch. The needle screw 34 is backed out of the bore until it does not project into the passageway 26. The reading of a standard pitot tube is set at 1.0 inch of water and both the pitot tube and the pitot probe 10 are positioned in a reference stream of air, with the static side of the probe not connected; i.e., the hose (not shown) coupling the return path to the bottom of the tube 24 is disconnected, and the inlet side of the probe is coupled to the total side of the measuring manometer.

With the above initial conditions, the output reading from the pitot probe should be between 0.1 inch and 0.3 inch of water, with the standard pitot tube reading being 1.0 inch of water. The next to be achieved goal is to cause their output ratios to come closer to a 1:10 ratio. This can be accomplished by reaming the passageway 26 with a long tapered reamer (about 15° taper) until the pitot probe output drops to 0.1 inch or just below. Care should be taken to cause the input side 28 to have the larger resulting diameter; hence, the reamer should be inserted from that side. As a consequence, not only will the desired 1:10 ratio be attained, but also a venturi configuration formed. Experience has shown that the passageway 26 will define a frustum, with the diameter at the input side 28 approaching 0.260 inch and the diameter at the static side 30 approaching 0.239 inch. Thus, the ratio of input side diameter to gate height into the flow stream 40 closely approximates 4:1.

The static side hose of the probe not shown then is connected and the output of the pitot probe will change to a value slightly less than the reading from the pitot tube standard. Thereupon, the needle screw 34 is turned to project into the passageway 26 until the output from the pitot probe matches that of pitot tube standard. At this juncture, the screw 34 is sealed in its position in the bore 32 by conventional sealant 54.

If the full scale flow is to be less than 700 cc per minute, the transverse passageway 26 can have a smaller pair of diameters and the height of the gate would be proportionately decreased, while at the same time maintaining the approximate 4:1 ratio. Nevertheless, the 1:10 ratio of pitot probe to pitot tube standard output, as above described, still would remain optimal for a wide range of racking.

If the known use of this system was to be for low flow rates, the output ratio could be reduced toward 1:5 to gain further tracking accuracy. Conversely, an increased ratio, such as 1:20, would increase tracking accuracy for high flow rate use.

With reference to FIG. 5, the handle portion 12 has a receptacle 56 for receiving the lower end of the probe conduit 16. An input chamber 58 is defined within the handle portion 12 and communicates with the tube 22 via its aperture 44 so that the shunted and channeled air stream component 40 passes into the chamber 58. A filter 60 is positioned within the input chamber 58 so that channeled air stream component 40 passes therethrough, and a tubular extension 62 forms the terminus of the chamber 58. A longitudinal return path chamber 64 extends the length of the handle portion 12, is isolated from the chamber 58, and bypasses the filter 60.

A rotatable, range selecting switch 66 mounted adjacent to the lower end of the handle portion 12. The range switch, which is shown in detail in FIG. 6, comprises a disc 68 having a plurality of apertures which cooperate in pairs. In a first orientation of the disc 68, the apertures 72 and 70 communicate, respectively, with the input chamber 58 and the return path chamber 64; and apertures 76 and 74 respectively communicate with the input chamber 58 and return path chamber 64 in a second orientation of the disc 68, the latter orientation being illustrated in FIG. 6. If desired, additional pairs of apertures can be provided. A central opening 78 in the disc 68 coacts with a compression screw 80 for securing and positioning the range switch disc 68.

The disc 68 is provided with a pair of radial bores 82 and 84 which are tapped and pass into the apertures 70 and 74, respectively, for adjustably holding needle valve screws 86 and 88. An access port 90 in the handle portion enables one to adjust the setting of a needle valve while the system is assembled, a feature not present in the range selecting switch in the cited copending application. Since the needle screws 86 and 88 thread into the apertures 70 and 74 on an axis normal to the axis of the apertures, the valves do not limit the maximum diameters of the apertures and their corresponding abilities to pass a large volume of air. In the copending application, the apertures and needle valves are coaxial and thus unduly limit the maximum air flow therethrough.

As readily seen from FIG. 6, the apertures 72 and 76 are significantly larger than their respective paired valved apertures 70 and 74, as well as being considerably different in diameter one to another. In this manner, the unvalved apertures 72 and 76 provide a certain amount of flow control, leaving the fine tuning control to the valved apertures and permitting the latter to be relatively larger than if the apertures 72 and 76 were of the same diameter as the return path chamber 64.

In a practical embodiment of the subject system, the aperture 72 is of 0.187 inch diameter and the aperture 76 has a 0.250 inch diameter. For a range switching control of from 5,000 to 10,000 feet per minute, the diameters of the apertures 74 and 70 are 0.0935 inch and 0.0625 inch, respectively. For switching control from 1,250 to 2,500 feet per minute, the corresponding aperture diameters are 0.144 inch and 0.0965 inch.

The needle valves 86 and 88 are adjustable via the access port 90. The valves are placed downstream of the measuring device, as shown in FIG. 5, in communication with the return path chamber 64, which is arranged to be coupled to a tubular extension 92, into which is received the returning air flow component 94 that then passes through the return chamber 64 and the tube 24 and out from the static side 30 of the probe tip, as shown in FIG. 2.

Not illustrated herein, but discussed and illustrated in the cited copending application is the structure for selectively rotating and detenting the disc 68 into its different range selecting positions.

A valved venting means 96 is mounted in the handle portion 12 to provide selectively a venting for the return path air component 94 as it passes through the return path chamber 64, whenever that chamber has its upper exit end blocked, as when a diffuser probe 98 is mounted in the handle portion, as shown in FIG. 7. Some probes, such as the diffuser probe 98, operate with air flow going therethrough only in one direction. That mode of operation contrasts the above described co-action and the operation of the pitot probe 10, which requires air input and return structure and flow. Consequently, when the diffuser probe 98 is mounted in the handle portion 12, the return path chamber is blocked and the return flow into that chamber, from the measuring device via the tubular extension 92, must be provided an exit or venting. As should be appreciated, such venting must be eliminated when the pitot probe 10 is employed.

The valved venting means is shown in its two positions in FIGS. 5 and 8 and comprises an air exit port 100 which passes through one side of the handle portion 12 into the chamber 64. Threaded into the port 100 is a retaining cap 102 having an annular top which reduces the diameter of the exit port to provide an internal ledge 104. The inward end of the retaining cap defines a valve seat 106. A push button valve member 108 is mounted through the port 100 and has its sealing rim 110 coupled to a seated, compressed spring 112, which biases the sealing rim 110 against the valve seat 106. A stem part 114 of the valve member 108 passes through the annular top of the retaining cap 102 and has a shoulder portion 116 which, when the top of the push button member is depressed inward against the bias of the spring 112, enables the shoulder portion to slip behind the ledge 104 to detent the valve into the open and venting condition, as shown in FIG. 8. That action opens a venting path through the port 100 between the stem part 114 and the annular top of the retaining cap 102.

When the diffuser probe 98, handle portion 12, and measuring device are combined as a system, the incoming air stream 38 flows into the probe through a calibrated metering portion 118 in the probe and out from orifices 120 into the chamber 58, as shown in FIG. 7. From the chamber 58 the air stream flows through the range switch 66, out from the handle portion at 62, into and out from the measuring device 14, back into the handle portion at 92, through one of the valved apertures 70, 74 of range switch 66, into the chamber 64, which is blocked by the probe 98, and out through the venting means 96, as shown in FIG. 8.

It should be pointed out that the plug 43 may be of the type which includes a portion (not shown) which acts partially to constrict the tube 24 so that the diameter available for passage of flow 94 can be controlled and calibrated from probe to probe to obtain reproducability from probe to probe for application or use in the system and enable any one of the calibrated probes to be utilized in the system without further calibration. That portion may be a separate apertured plug received within tube 24 at the lower end thereof.

It is believed that the invention has been illustrated and described in sufficient detail for those skilled in the art to appreciate same and be able to practice its teachings even to the extent of incorporating variations and modifications lying within the spirit and scope of the invention.

What is sought to be secured by United States Letters Patent is:

1. An air velocity probe arranged to track a pitot standard, comprising:
    a probe tip constructed for insertion orthogonally into an air stream;
    a smooth and continuous bore passing through said probe tip defining a transverse passageway through said probe tip for parallel orientation with the air stream;

an air shunting gate lying normal to said passageway near its midpoint and having longitudinal side walls depending from said passageway, lying transverse to the axis of said bore, and spaced apart by a distance significantly less than the axial length of said bore;

an uppermost portion of said gate being defined by the upper ends of said side walls and said smooth bore;

said probe tip having longitudinal internal walls which, in combination with said side walls, define a pair of air channels, which depend from said passageway, one on each side of said gate;

said channels having respective input and output ends, with the input end of one of said channels and the output end of the other of said channels being adjacent said passageway;

air flow conduit means constructed to receive the air flow through each of said channel separately, to encompass the output end of said one channel and the input end of said other channel, and having a top end which terminates a significant distance below said uppermost portion of said gate; and a variable height baffle mounted in said probe tip and projectable into said passageway for regulating the amount of the air stream flowing therethrough with respect to the amount of the air stream shunted by said shunting gate into the input end of said one channel.

2. An air velocity probe according to claim 1 which the diameter of said passageway and said distance between the top of said conduit means and the uppermost portion of said gate combine to define a coactive relationship which determines, in part, the amount of shunted air stream and enhances the tracking of said probe to pitot standard.

3. An air velocity probe according to claim 2 in which said passageway is tapered, with its diameter proximate the input end of said one channel being larger than its diameter proximate the output end of said other channel.

4. An air velocity probe according to claim 2 in which said probe tip and said conduit means are separable and constructed for interconnection and at least one of said probe tip and conduit means includes structure for maintaining said distance between the top of said conduit means and the uppermost portion of said gate.

5. An air velocity probe according to claim 2 in which said coactive relationship approximates a ratio of 4:1 between the diameter of said passageway and said distance between the top of said conduit means and the uppermost portion of said gate.

6. An air velocity probe according to claim 5 in which the diameter of said passageway is close to 0.26 inch.

7. A method for calibration of an air velocity probe constructed according to claim 1 comprising the steps of:

placing said probe into an air stream the velocity of which is subject to the comparative measurement by way of the probe and a pitot standard, arranging the probe with respect to air stream and the said pair of channels such that a portion of said air stream is shunted into the input end of said one channel and none of said shunted air stream enters the input end of said other channel, adjusting said variable height baffle so that it does not project into said passageway, sizing the diameter of said passageway, at least adjacent to said one channel, until there obtains an approximate ratio of 1:10 between the comparative measurements of said probe and the output reading of the pitot standard, rearranging the probe with respect to the air stream through said pair of channels so that said other channel is in a return path for the shunted air stream portion, and readjusting the variable height baffle to project into said passageway an extent which causes the comparative measurement by way of said probe and the pitot standard to be equal.

8. A method according to claim 7, wherein said sizing is accomplished by reaming said bore to increase the diameter of said passageway and to yield a tapered profile, with the larger end of the taper being proximate said one channel.

9. An air velocity probe according to claim 1 and in combination therewith range selecting switch means coupled to said pair of channels by way of said conduit means, said switch means including selectable pairs of paths, one of said paths of a selected pair being alignable for communication with air flow through said one channel, and the other of said paths of the same selected pair thereupon being aligned for communication with the separate air flow through said other channel, and valve means carried in each of said pairs of paths for calibrating a specifically selectable range, said valve means being mounted with respect to said paths and said switch means to be adjustable from external said switch means when operatively coupled to said probe.

10 The combination according to claim 9 in which said range selecting switch means comprises a rotatable disc having an axis of rotation which is generally parallel to said channels, said disc having pairs of longitudinal apertures having side walls which define said pairs of paths, and said valve means is mounted in certain of the apertures in a radial orientation with respect to their side walls so that access to said valve means is from a direction radial of the axis of said disc.

11. The combination according to claim 9 in which the cross sectional areas of said paths of any said pair of paths are significantly different from one another.

12. The combination according to claim 9 in which said switch means is carried in an accessory handle portion having one end which is connectable to said conduit means of said probe, and an opposite end which is connectable to an air velocity measuring device which has an air flow input and an air flow return path output, and said handle portion having air chambers which keep separate the input air flow and the return path air flow for communication to said one and said other channels, respectively.

13. The combination according to claim 12 in which said accessory handle portion includes
    selectively operable venting means mounted with respect to said air chambers to directly vent the return path air flow out from said handle portion prior to its reaching said one end.

14. The combination according to claim 13 in which said venting means comprises
    detentable valve means, manually operable from external said accessory handle portion.

15. The combination according to claim 13 which further comprises
    a second air velocity probe,
    said second probe having an air flow output end connectable to said one end of said accessory handle in lieu of said conduit means,
    said output end of said second probe, when so connected with said accessory handle portion, arranged to be oriented with respect to said air chambers to inhibit return path air flow from the air velocity measuring device from leaving said combination, except by way of said venting means.

16. The combination according to claim 15 in which said second probe includes
    air flow calibration means mounted for external access for calibration of said second probe.

17. The air velocity probe according to claim 1 and, in combination therewith,
    an accessory handle portion having one end which is connectable to said conduit means of said probe, and an opposite end which is connectable to an air velocity measuring device, having an air flow input and an air flow return path output, and
    said handle portion having air chambers which keep separate the input and return path air flow for communication to said one and said other channels, respectively.

18. The combination according to claim 17 in which said accessory handle portion includes
    selectively operable venting means mounted with respect to said air chambers to directly vent the return path air flow out from said handle portion prior to its reaching said one end.

19. The combination according to claim 18 in which said venting means comprises
    detentable valve means, manually operable from external said accessory handle portion.

20. The combination according to claim 18 which further comprises
    a second air velocity probe,
    said second probe having an air flow output end connectable to said one end of said accessory handle in lieu of said conduit means,
    said output end of said second probe, when so connected with said accessory handle portion, arranged to be oriented with respect to said air chambers to inhibit return path air flow from the air velocity measuring device from leaving said combination, except by way of said venting means.

21. The combination according to claim 20 in which said second probe includes
    air flow calibration means mounted for external access for calibration of said second probe.

* * * * *